United States Patent
Liu et al.

(10) Patent No.: US 11,218,453 B2
(45) Date of Patent: Jan. 4, 2022

(54) EXCHANGING ENCRYPTED MESSAGES AMONG MULTIPLE AGENTS

(71) Applicant: WhatsApp LLC, Menlo Park, CA (US)

(72) Inventors: Alan Chun Tung Liu, Mountain View, CA (US); Mitu Singh, San Carlos, CA (US)

(73) Assignee: WhatsApp LLC, Menlo Park, CA (US)

( * ) Notice: Subject to any disclaimer, the term of this patent is extended or adjusted under 35 U.S.C. 154(b) by 455 days.

(21) Appl. No.: 16/051,348

(22) Filed: Jul. 31, 2018

(65) Prior Publication Data

US 2020/0045022 A1   Feb. 6, 2020

(51) Int. Cl.
*H04L 9/32* (2006.01)
*H04L 29/06* (2006.01)
*G06Q 10/10* (2012.01)

(52) U.S. Cl.
CPC ......... *H04L 63/0428* (2013.01); *G06Q 10/10* (2013.01); *H04L 9/3247* (2013.01); *H04L 63/104* (2013.01)

(58) Field of Classification Search
CPC . H04L 63/0428; H04L 63/104; H04L 9/3247; G06Q 10/10
USPC ........................................................ 713/168
See application file for complete search history.

(56) References Cited

U.S. PATENT DOCUMENTS

| | | | | |
|---|---|---|---|---|
| 2001/0020228 A1* | 9/2001 | Cantu | ................... | H04L 9/3213 705/50 |
| 2004/0148356 A1* | 7/2004 | Bishop, Jr. | .............. | H04L 51/38 709/206 |
| 2004/0230657 A1* | 11/2004 | Tomkow | ............... | H04L 63/123 709/206 |

* cited by examiner

*Primary Examiner* — Jeffrey C Pwu
*Assistant Examiner* — Samuel Ambaye
(74) *Attorney, Agent, or Firm* — Fenwick & West LLP

(57) ABSTRACT

A messaging system interacts with the messaging applications of customer, admin, and agent clients to support encrypted communications among customers and businesses. To register as an agent of the business, an agent client sends registration information to the messaging system and receives a barcode in response. The messaging system validates information about the barcode received from the admin client and sends a validation code to the admin client. The admin client displays the validation code, and the validation code is entered into the agent client. The admin client generates a membership list including an agent client identifier, digitally signs the membership list, and provides the signed membership list to the messaging system. When a customer messages the business, the messaging system forms a customer group using the signed membership list and distributes the message to the agent clients in the group.

17 Claims, 6 Drawing Sheets

EXCHANGING ENCRYPTED MESSAGES AMONG MULTIPLE AGENTS

BACKGROUND

This disclosure relates generally to electronic messaging, and more particularly to exchanging encrypted messages among multiple parties.

Use of text-based dedicated messaging applications is becoming more commonplace. Dedicated messaging applications provide a rich feature set that may not be available using conventional email or other messaging technologies. Both the sender and receiver of the messages can be authenticated and delivery of the messages can be verified. In addition, the messages can include certain formatting and/or content features that are not supported by other messaging technologies. For these reasons, customers use such applications as a convenient way to contact businesses. Businesses, in turn, use such applications to communicate directly with their customers and potential customers.

Businesses may have difficulty managing the communications from customers. The volume of communications may be such that the businesses cannot respond to customers in a timely manner. This issue is compounded in environments in which the communications are encrypted. Maintaining the encryption limits the ability of the businesses to share and respond to received messages. As a result, it is difficult for businesses to leverage the advantages provided by dedicated messaging applications, particularly messaging applications that provide end-to-end encryption.

SUMMARY

A messaging system interacts with the messaging applications of customer, admin, and agent clients to support encrypted communications among customers and businesses. In addition, the messaging system allows administrators to register agents for their respective businesses. In one embodiment, the messaging system maintains digitally-signed membership lists using the agent identifiers to identify the agents registered with the respective businesses.

To register an agent with the business, the user of an agent client sends registration information to the messaging system and receives a unique registration identifier in response. A messaging application shows a matrix barcode generated using the registration identifier on a display of the agent client. The administrator of the business uses an admin client to capture an image of the displayed barcode. The admin client sends a description of the barcode to the messaging system.

The messaging system validates the barcode and sends a validation code to the admin client. The admin client displays the validation code, and the user of the agent client enters the validation code into the agent client. The agent client sends the validation code back to the messaging system. The messaging system associates the agent client with the business and generates an agent client identifier for that agent client. The messaging system provides the agent client identifier to the agent client and the admin client. The admin client generates a membership list including the agent client identifier, digitally signs the membership list, and provides the signed membership list to the messaging system.

When a customer initially messages a business using the identifier of the admin client, the messaging system uses the signed membership list for the business to form a customer group including the identifiers of the customer client and the agent clients for the business. The messaging system provides the customer group to the customer client, and the customer client uses the customer group to establish secure communication channels with the agent clients. Upon receiving a message from the customer to the business, or from an agent to the customer, the messaging system distributes the message to the other members of the customer group. These messages exchanged among the agents and the customer are encrypted and decrypted using security information exchanged using secure communications channels, which means only the parties to the message thread (and not the messaging system) can access the contents of the messages.

The messaging system allows businesses to communicate with users, such as customers and potential customers, in a flexible and convenient manner. A message from a customer is delivered to all of the agents in the business's membership list. A particular agent can respond to the customer, and the entire message thread is exchanged with all of the business's agents. Any agent can therefore pick up a conversation and reply to a customer in the existing thread. Furthermore, the content of the messages in the thread are encrypted to prevent eavesdropping by the messaging server or other entities. Businesses are thus able to use dedicated messaging applications to exchange messages with customers and potential customers.

The figures depict various embodiments of the present invention for the purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
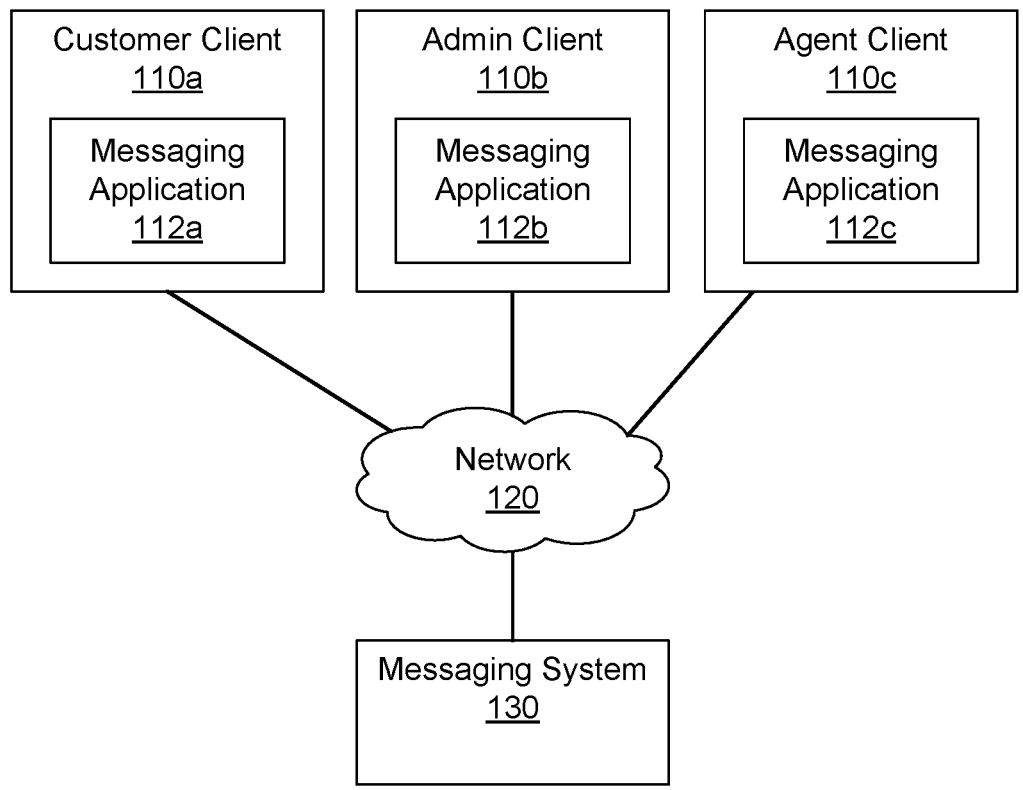
FIG. 1 is a high-level block diagram illustrating a system environment including an electronic messaging system according to one embodiment.

FIG. 1 is a high-level block diagram illustrating a system environment 100 including an electronic messaging system 130 according to one embodiment. The environment 100 also includes three clients 110 connected to the messaging system 130 via a network 120. While FIG. 1 shows only three clients 110 and a single messaging system 130, embodiments of the environment 100 may have many such clients and multiple messaging systems connected to the network 120. Other components may also be connected to the network 120. The clients 110 and messaging system 130 may be respectively implemented using one or more dedicated computers and/or a cloud computing platform. FIG. 1 uses like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a," "110b," and/or "110c" in the figures.

A client 110 is a computing device that can transmit and/or receive data via the network 120. A user may use the client 110 device to perform functions such as exchanging messages using the messaging system 130, browsing websites on web servers on the network 120, consuming digital content received via the network, and executing software applications. For example, the client 110 may be a smartphone or a tablet, notebook, or desktop computer. In addition, the client 110 may be an Internet-of-Things (IoT)-connected device such as a home appliance.

The client 110 may execute one or more applications ("apps") that extend the functionality of the client. The apps may include a web browser that allows the client 110 to interact with websites provided by servers connected to the network 120. The apps may also include one or more dedicated apps for accessing the messaging system 130. In one embodiment, the user downloads and installs apps on the client 110 for specific purposes, such as exchanging messages using the messaging system 130. Alternatively, the functionality of an app may be incorporated into an operating system of the client 110 or included in native functionality of the client.

The messaging application 112 illustrated within the client 110 in FIG. 1 represents an app for interacting with the messaging system 130 via the network 120. The messaging application 112 interacts with the messaging system 130 and enables a user of the client 110 to exchange messages with users of other clients. The messages may be encrypted.

The three clients 110 illustrated in FIG. 1 are respectively labeled as "customer" 110a," "admin" 110b, and "agent" 110c clients. The customer client 110a is used by a customer to communicate with a business via the messaging system 130. For example, the customer may select the business's phone number from an address book maintained on the client 110 and request to send a message to the business, use the messaging application 112 to conduct a search and then request to send a message to the business listed in the search results, and/or visit a web page or other location that includes a communication link with which the customer can interact to initiate communications with the business. The communication link may take the form of a code such as a clickable object or scannable image that contains a reference to the business's presence in the messaging system 130. When a customer interacts with the communication link, the messaging application 112 of the customer's client 110a interacts with the messaging system 130 to exchange messaging information allowing the customer and business to communicate using the messaging application 112.

The admin client 110b represents a client used by an administrator associated with a business. The business is typically a for-profit organization that uses the messaging system 130 to communicate with its customers. However, the business can also be another type of organization such as a non-profit organization, an educational organization, or a government organization. All of these types of organizations are considered "businesses" for purposes of this description. Moreover, a business is merely one example of a communicating entity within the environment of FIG. 1. The techniques described herein can be used to support communications with entities other than businesses.

The administrator can use the admin client 110b communicate with customers of the business. For example, the administrator can use the admin client 110b to respond to messages received from customer clients 110a and to communicate with agents of the business. In this sense the admin client 110b also functions as an agent client 110c. In addition, the administrator can use the admin client 110b to register one or more other clients as agent clients 110c of the business, and to communicate with the agents.

An agent client 110c is used by a user who is an agent for the business. An agent uses the agent client 110c to interact with an administrator using an admin client 110b to register as an agent of the business with respect to interactions with customers of the business. A given business may have multiple agents, and different agents may be active at different times. For example, a large business may have hundreds of agents while a small business may have one or a few agents.

The messaging application 112 executing on a client 110 associates a unique identifier with the client with respect to the messaging system 130. In one embodiment, the unique identifiers for customer 110a and admin 110b clients are based on the telephone numbers associated with mobile devices serving as the clients. For example, the unique identifiers may be the telephone numbers combined with a server address associated with the messaging system 130. Thus, the unique identifier of a customer client 110a might be 4155551212@a.whatsapp.net, where 4155551212 is the telephone number of the customer client and a.whatsapp.net is the server address for the messaging system 130. The unique identifier of an admin client 110b might be 4155551212@b.whatsapp.net. Here, the sample telephone number is again 4155551212 and b.whatsapp.net is the server address for the messaging system 130, with the "b" prefix indicating that the identifier is for an admin client 110b rather than for a customer client 110a. The unique identifier of the admin client 110b may also serve as the communication link that a customer uses to message the business.

The unique identifier of an agent client 110c, in contrast, is based on the identifier of the admin client 110b for the business with which the agent is associated. For example, the identifier of an agent client 110c may incorporate the phone number of the admin client 110b plus an additional prefix and/or suffix that is unique to the agent client 110c. Thus, if the identifier of the admin client 110b is 4155551212@b.whatsapp.net, the identifier of an agent may be 4155551212.1@b.whatsapp.net, where the ".1" is a suffix that when combined with the telephone number uniquely identifies the agent client 110c. The suffix may be incremented to form the unique identifiers of additional agent clients 110c.

In one embodiment, the messages between the customers and the business (e.g., the administrator and/or agents) are organized as message threads. That is, a given customer has a message thread with a business, where the thread represents the text-based messages exchanged between the user and the business (i.e., the agents of the business) via the messaging system 130. The identities of the agents may be hidden from the customer such that messages from the business appear to come from the business rather than from the different agents.

The messaging system 130 interacts with the messaging applications 112 of the customer 110a, admin 110b, and agent 110c clients to support encrypted communications among customers and businesses. In addition, the messaging system 130 allows administrators to register agents for their respective businesses. In one embodiment, the messaging system 130 maintains digitally-signed membership lists using the agent identifiers to identify the agents registered with the respective businesses.

When a customer initially messages a business using the unique identifier of the admin client 110b, the messaging system 130 uses a signed membership list for the business to form a customer group including the identifiers of the customer client 110a and the agent clients 110c for the business. The messaging system 130 provides the customer group to the customer client 110a, and the customer client uses the customer group to establish secure communication channels with the agent clients 110c. Upon receiving a message from the customer to the business, or from an agent to the customer, the messaging system 130 distributes the message to the other members of the customer group. These messages exchanged among the agents and the customer in a thread are encrypted and decrypted using previously-established the secure communications channels, which means only the parties to the message thread (and not the messaging system 130) can access the contents of the messages.

The messaging system 130 allows businesses to communicate with users, such as customers and potential customers, in a flexible and convenient manner. A message from a customer is delivered to all of the agents in the business's membership list. A particular agent can respond to the customer, and the entire message thread is exchanged with all of the business's agents. Any agent can therefore pick up a conversation and reply to a customer in the existing thread. Furthermore, the content of the messages in the thread are encrypted to prevent eavesdropping by the messaging server 130 or other entities. Businesses are thus able to use dedicated messaging applications to securely exchange messages with customers and potential customers.

The network 120 exchanges information among clients, servers, and systems connected to it. In one embodiment, the network 120 uses standard communications technologies and/or protocols. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 2:
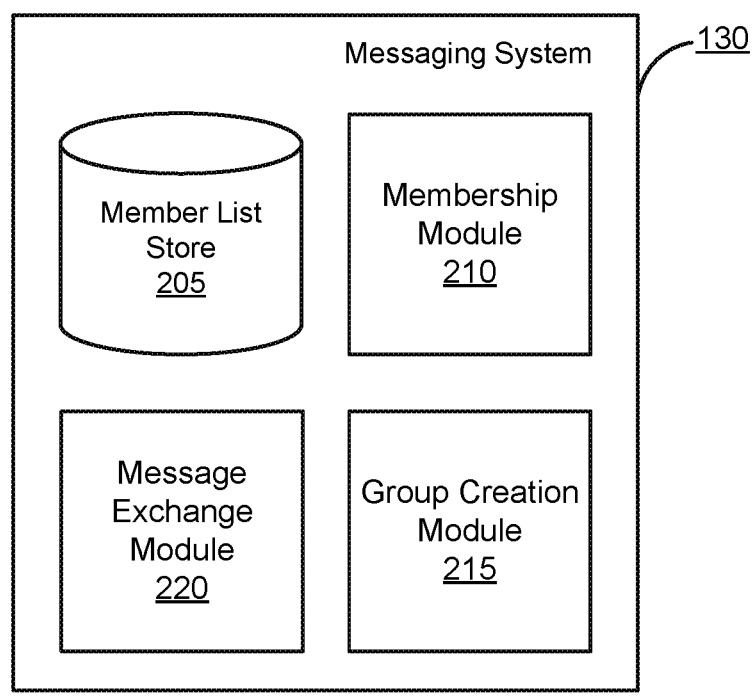
FIG. 2 is a block diagram illustrating a more detailed view of the messaging system according to one embodiment.

FIG. 2 is a block diagram illustrating a more detailed view of the messaging system 130 according to one embodiment. The messaging system 130 shown in FIG. 2 includes multiple modules. In other embodiments, the messaging system 130 may include additional, fewer, or different modules. In addition, the functionality attributed to specific modules herein may be performed by other modules in other embodiments.

A data store 205 stores information used by the messaging system 130 during its operation. The information within the data store 205 may include signed membership lists identifying the agents registered with respective businesses. The information within the data store 205 may also include customer groups associated with message threads involving individual customers and particular businesses. In one embodiment, the data store 205 is implemented as a relational and/or flat-file database. Other implementations may also be used.

A membership module 210 establishes and maintains membership lists on behalf of businesses. In one embodiment, the membership module 210 interacts with an admin client 110b used by an administrator of a business. The membership module 210 interacts with the administrator to create a business account for the business, and associates the administrator with the business.

The membership module 210 also provides functionality allowing the administrator to register agents for the business. For example, the membership module 210 may interact with the messaging application 112b in the admin client 110b to allow the administrator to activate agent-registration functionality. Once this functionality is activated, the membership module 210 participates in a workflow, described in more detail below, that results in validating a particular agent client 110c as belonging to an agent associated with a particular business. In particular, the membership module 210 generates unique registration identifiers and provides the identifiers to agent clients 110c. The agent clients 110c may then display the identifiers as matrix barcodes such as QR codes, or as other forms of barcodes. The membership module 210 also verifies information about captured barcodes received from admin clients 110b, provides the admin clients with validation codes and agent client identifiers, and verifies validation codes received from agent clients 110c.

The membership module 210 stores membership lists identifying the agents associated with particular businesses in the data store 205. In one embodiment, the membership module 210 receives a membership list from the admin client 110b of the associated business and stores it in the data store 205. The membership list identifies the business using a unique identifier of the business (e.g., the unique identifier of the admin client 110b for the business), and identifies each agent using a unique identifier of the respective agent clients 110c. In one embodiment, the membership list of a business can include membership lists of other businesses, thus allowing for hierarchies of membership lists.

Further, the membership list is digitally-signed by the admin client 110b. The membership module 210 uses the digital signature to verify that the list was received from the admin client 110b and has not been altered. Further, in one embodiment the received membership list includes a creation date and validity period. The membership module 210 uses the date and validity period to verify that the list is valid. The membership module 210 may reject (i.e., not store) any received membership lists that lack valid digital signatures or are not within the validity period. In addition, the membership module 210 may remove previously-stored membership lists from the data store 205 if the validity period of the lists expire.

The membership module 210 may receive updated membership lists from an admin client 110b if the agents of the business associated with the admin client change. For example, the membership module 210 may receive an updated membership list that adds a new agent client 110c and/or removes a former agent client. In this case, the membership module 210 verifies that the updated list and replaces the stored membership list with the updated list.

A group creation module 215 creates customer groups for interactions between customers and agents. When the messaging system 130 receives an initial indication that a customer client 110a is sending a message to a particular business (e.g., sent to the unique identifier of the admin client 110b for the business), the group creation module 215 identifies the membership list for the business from the data store 205. The group creation module 215 then creates a new customer group using the membership list. The customer group includes the identifiers of the agent clients 110*c* for the business and the identifier of the customer client 110*a*. For example, the customer group may include the identifier of the customer client 110*a* and the membership list for the business. The membership list may be delineated and include the digital signature provided by the admin client 110*b*, thus allowing recipients of the customer group to validate the membership list using the signature.

The group creation module 215 creates a separate customer group for each unique customer/business pair. For example, if a given customer sends separate messages to first and second businesses, the group creation module 215 will create two separate customer groups, one group including the customer client 110*a* identifier and the agent client 110*c* identifiers for the first business, and the other group including the customer client identifier and the agent client identifiers for the second business. In another example, if two different customers message the same business, the group creation module 215 will create two separate customer groups, one group including the customer client 110*a* for the first customer and the agent client 110*c* identifiers for the business, the other group including the customer client identifier for the second customer and the agent client identifiers for the business.

The group creation module 205 stores the customer groups in the data store 205. In addition, the group creation module 205 updates the customer groups based on any changes to the membership lists on which the groups are based. Thus, if the membership module 205 receives and stores an updated membership list for a business from an admin client 110*b*, the group creation module 205 updates the customer groups accordingly. The group creation module 205 may also delete customer groups if a membership list for a business is deleted or expires without replacement.

In addition, the group creation module 205 provides copies of the customer groups to the clients 110 listed within the groups. Thus, the group creation module 205 provides a customer client 110*a* with a copy of each customer group in which the customer client is listed. Likewise, the group creation module 205 provides each agent client 110*c* with a copy of each customer group in which the agent client is listed. The group creation module 205 may provide the copies of the groups to the clients 110 when the groups are created, and also provide updated groups to the clients as the groups change. In addition, the group creation module 205 may provide only a subset of the identifiers in a customer group to a client 110. For example, the group creation module 205 may send each client 110 a version of the customer group that omits that client's own identifier. In this example, the customer client 110*a* receives the signed membership list for the business as the customer group.

A message exchange module 220 supports the exchange of encrypted group messages using the messaging system 130. In one embodiment, the message exchange module 220 receives a message and determines the identifiers of the sender and recipient of the message. The message exchange module 220 examines the sender and recipient identifiers to determine whether any of the identifiers are associated with a business. In one embodiment, the presence of a particular token in the identifier indicates an association with a business, such as the "b" token in the prefix of the server address in the sample identifier 4155551212@b.whatsapp.net. If neither identifier is associated with a business, then the message exchange module 220 forwards the message to the identified recipient.

If the sender or recipient identifier is associated with a business, the message exchange module 220 applies processing rules to the message in order to deliver the message to the appropriate recipients. If the sender of the message is not associated with a business (e.g., is from a customer client 110*a* with an identifier such as 4155551212@a.whatsapp.net), then the message is from a customer to a business. In this case, the message exchange module 220 determines whether a customer group exists in the data storage 205 for this customer/business pair. If the customer group exists, the message exchange module 220 fans out the message from the customer to each agent client 110*c* identified in the group. That is, the message exchange module 220 delivers a copy of the message to each agent client 110*c* listed in the group.

If no customer group exists for the customer/business pair, the message exchange module 220 interacts with the group creation module 215 to create the customer group and cause the customer group to be distributed to the clients 110 listed within the group. This step may be performed in response to the customer client 110*a* providing the message exchange module 220 with a request to send a message to an identified business, but before the message content is received from the customer client. In this way, the customer client 110*a* receives the customer group before sending the message content to the message exchange module 220. The message exchange module 220 fans out the message to the agent clients 110*c* in the newly-created group.

If the sender of the message is associated with a business (e.g., the message is from an agent client 110*c* with an identifier such as 4155551212.1@b.whatsapp.net), the message exchange module 220 determines whether the recipient is also associated with a business. If the recipient is associated with a business, the message exchange module 220 identifies the membership list for the business stored in the data store, and fans out the message to the agent clients 110*c* listed in the membership list. This type of message allows agents of a business to exchange messages with other agents of the same business without involving a customer in the thread.

If the sender of the message is associated with a business, but the recipient is not associated with a business, then the message is being sent from an agent client 110*c* to a customer client 110*a*. In this case, the message exchange module 220 identifies the customer group for the customer/business pair in the data storage 205. The message exchange module 220 then fans out the message to the customer client 110*a* and any other agent clients 110*c* identified in the group. The message exchange module 220 thus delivers the message to the customer recipient and provides copies of the message to the other agents. In one embodiment, the message exchange module 220 verifies that the identifier of the sender is included in the customer group for the customer/business pair before fanning out the message. This step prevents a former agent of the business from sending a message to the customer.

Figure 3:
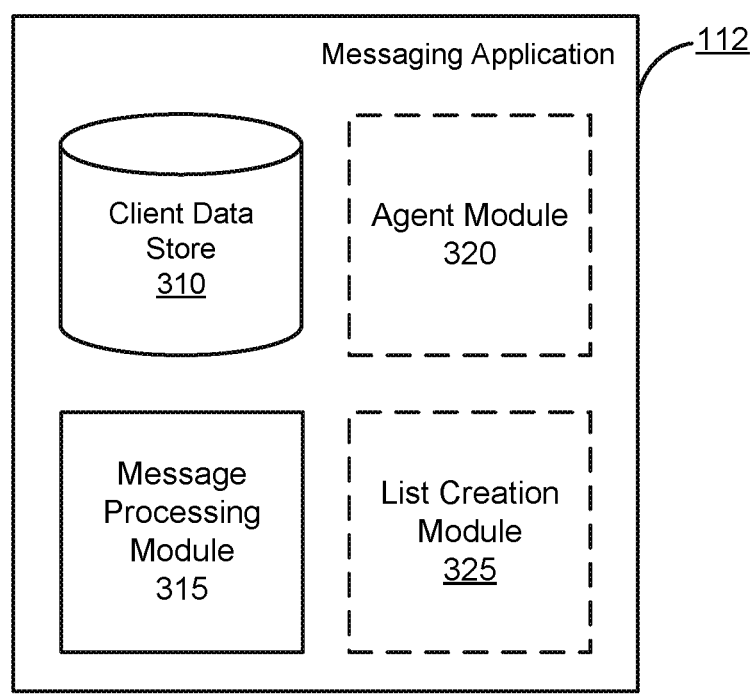
FIG. 3 is a high-level block diagram illustrating details of the messaging application according to one embodiment.

FIG. 3 is a high-level block diagram illustrating details of the messaging application 112 according to one embodiment. FIG. 3 illustrates multiple modules within the messaging application 112. Different embodiments of the messaging application 112 may have different or additional modules than those shown in FIG. 3. In addition, functionalities may be distributed among the modules in different manners.

The messaging application 112 of FIG. 3 may be executed within a client 110 of FIG. 1. Different types of clients 110 may execute different versions of the messaging application having different functionalities. For example, the version of the application 112*b* executed by an admin client 110*b* may be different than the version 110*a* executed by a customer client 110*a*. FIG. 3 illustrates modules that are common to all versions of the messaging application 112 in one embodiment using solid lines, and illustrates modules that may be found in only certain versions of the messaging application 112 using broken lines.

A client data store 310 stores data used by the messaging application 112 during its operation. The data may be generated locally by the messaging application 112, received from other clients 110, and/or received from the messaging system 130. The data stored may include membership lists, customer groups, encryption keys, and exchanged messages.

A message processing module 315 performs tasks associated with exchanging messages using the messaging system 130. These tasks include managing encryption, composing and sending messages, and displaying received messages.

In one embodiment, the message processing module 315 supports encrypted messaging by establishing encrypted communications channels with messaging applications 112 of other clients 110 with which the given application will exchange messages. The message processing module 315 uses the encrypted communications channels to exchange keys and/or other security information for decrypting messages exchanged using the messaging processing module. The message processing module 315 sends other clients 110 security information that the clients can use to decrypt messages sent by the message processing module, and receives from other clients security information that the message processing module can use to decrypt messages from those clients.

In more detail, as the client 110 is used by a user, the messaging application 112 receives identifiers of other clients 110 in customer groups from the messaging server 130 or other sources. For example, the messaging application 112 may receive the identifier of an admin client 110*b* (which also serves as an identifier of a customer group) when a user of a customer client 110*a* interacts with the communication link of a business posted on a web page. Likewise, the messaging application 112 may receive identifiers of customer 110*a* and/or agent 112*c* clients in customer groups for respective businesses received from the messaging server 130. Upon receiving a customer group, the client 110 validates the group using the group's digital signature. This validation ensures that the group contains only agents authorized by the administrator of the respective business and serves to prevent the messaging system 130 from inserting additional agents into the group. After validating the customer group, or at a different time such as when sending a message to a customer group, the message processing module 315 uses public key encryption (PKE)-based techniques to establish a secure communication channel with each other clients 110 listed in the group. This channel allows the messaging processing modules 315 of the two clients 110 to directly exchange encrypted messages. The client 110 may interact with the messaging system 110 to establish point-to-point communications between the clients in order to establish the secure channel.

The message processing module 315 establishes a symmetric sender key that it will use to encrypt messages sent to the customer group in which the other client 110 is a member, and it sends the sender key to the other client via the secure communication channel. The message processing module 315 uses this technique to send the same sender key to each other client in the customer group. In some embodiments, the messaging processing module 315 provides the other clients of the customer group with security information that the other clients can use to derive the sender key, rather than sending the key itself. Additionally, the sender key may change deterministically based on the number of messages sent by the message processing module 315, allowing other clients to derive the changed sender key based on the number of messages the clients have received from the particular sender.

The message processing module 315 further provides user interface (UI) elements allowing the user of the client to compose and send messages to other clients 110 and customer groups. The contents of the messages may include text, images, emojis, stickers, videos, audio and/or other forms of content. In addition, the message processing module 315 displays received messages in the UI. The received messages may be displayed in a threaded manner, so that individual message threads are displayed as a collection of related messages. Depending upon the embodiment, the message processing module 315 may mask the identities of the individual agents who send messages on behalf of a business. The message processing module 315 may display the business as the sender of the messages, thereby hiding the fact that the messages may have been sent by different agents. The message processing module 315 may also use colors or other UI elements to signify that that different message are from different agents, without revealing the identities of the agents.

An agent module 320 is present on the messaging applications 112 of admin 110*b* and agent 110*c* clients and supports registration of agents on behalf of businesses. An administrator for a business using an admin client 110*b* interacts with a UI provided by the agent module 320 to indicate that agents are permitted for the business. In addition, a user of an agent client 110*c* interacts with the agent module 320 to participate in the workflow to register the agent client as an agent of the business. When the user of the agent client 110*c* interacts with the agent module 320, the agent module 320 sends registration information to the messaging system 130. The registration information may include the phone number or other identifier of the agent client 110*c*, the name and/or other identifiers of the business, and/or the name and other personal information about the user registering as the agent.

In response to providing the registration information to the messaging system 130, the agent module 320 of the agent client 110*c* receives a unique registration identifier for the agent. The agent module 320 shows a barcode generated using the registration identifier on a display of the agent client 110*c*. The administrator of the business uses a camera on the admin client 110*b* to capture an image of the barcode displayed on the agent client 110*c*. Then, the agent module 320 of the admin client 110*b* sends a description of the barcode to the messaging system 130.

The agent module 320 of the admin client 110*b* receives a validation code from the messaging system 130 in response to validation of the barcode. In addition, the agent module 320 of the admin client 110*b* receives the agent client identifier for the agent client 110*c*. The agent module 320 of the admin client 110*c* displays the validation code on the admin client 110*b*. The agent enters the displayed validation code into the agent client 110*c*, and the agent module 320 of the agent client sends the validation code to the messaging system 130.

The agent module 320 of the agent client 110*c* receives a signal from the messaging system 130 indicating approval of the validation code, which also indicates that the messaging system 130 has associated the agent client identifier with the agent client. In response, the agent module causes the agent client 110*c* to become an agent of the business. Specifically, the agent module 320 receives an agent ID for the agent client 110*c* from the messaging system 130 and activates the functionality in the messaging application 112*c* allowing the agent client to receive and send messages as an agent of the business.

The agent module 320 of the admin client 110*b* also provides a UI allowing the administrator of the business to review the agents for the business and selectively deactivate particular agents. In this way the administrator can curate the list of agents for the business.

A list creation module 325 is present on the messaging application 112*b* of admin clients 110*b* and creates and modifies membership lists identifying the agents associated with a business. In one embodiment, the list creation module 325 receives the agent client identifiers sent by the messaging system 130 in response to validation of barcodes. The list creation module 335 maintains the agent client identifiers in a membership list for the associated business. The list creation module 325 digitally signs the membership list and provides the signed membership list to the messaging system 130. The list creation module 325 may provide the list when the list changes due to the addition or removal of agents, expiration of a validity period associated with the list, and/or at other times.

Figure 4:
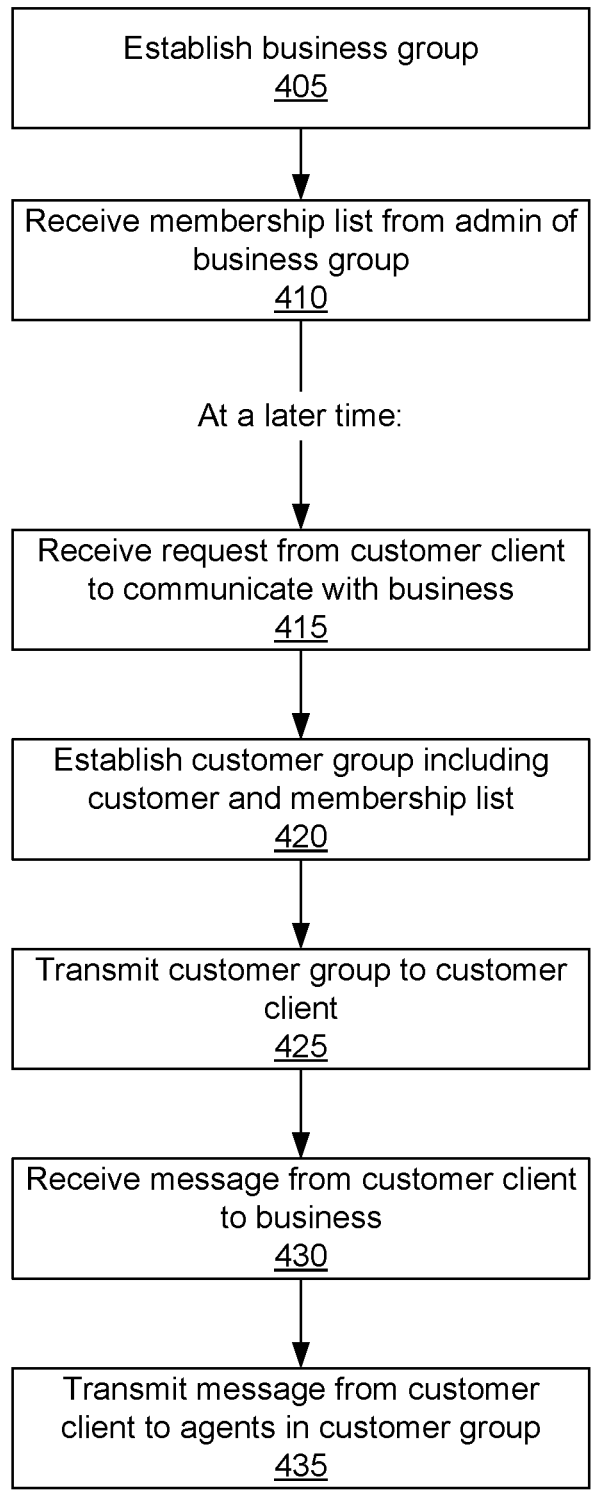
FIG. 4 is a flowchart illustrating steps performed by the messaging system to support group messaging according to one embodiment.

FIG. 4 is a flowchart illustrating steps performed by the messaging system 130 to support group messaging according to one embodiment. Other embodiments may perform different steps and/or perform the steps in different orders. In addition, at least some of the illustrated steps may be performed by other entities in other embodiments.

Initially, the messaging system 130 establishes 405 a business group for a business. An administrator of a business uses the messaging application 112*b* of an admin client 110*b* to register the admin client 110*b* as associated with the business. In response, the messaging system 130 creates an admin client identifier and provides the identifier to the admin client. The administrator may make this identifier publicly-accessible by, e.g., posting the identifier on a web page as a way to contact the business. The messaging system 130 also receives 410 a digitally-signed membership list from the admin client 110*b*. The signed membership list identifies the agent clients 110*c* registered as agents of the business.

Subsequently, the messaging system 130 receives 415 a request from a customer client 110*a* to communicate with the business. This request may be received in response to the customer selecting the admin client identifier posted by the administrator of the business (e.g., clicking a link that references the admin client identifier). The messaging system 130 establishes 420 a customer group for the customer/business pair including the identifier of the customer client 110*a* and the identifiers of the agent clients 110*c* in the membership list for the business. The messaging system 130 transmits 425 the customer group to the customer client 110*a*. The customer client 110*a* validates the customer group by verifying the digital signature of the membership list and uses the customer group to securely exchange sending keys with the agent clients 110*c* in the group.

The messaging system 130 receives 430 a message from the customer client 110*a* directed to the business. This message is encrypted using the customer client's sending key such that the message content cannot be decrypted by the messaging system 130. The messaging system 130 transmits 435 the message to the agent clients 110*c* listed in the customer group for the customer/business pair. The agent clients 110*c* can use the sending key received from the agent client 110*a* to decrypt the content of the message.

Figure 5:
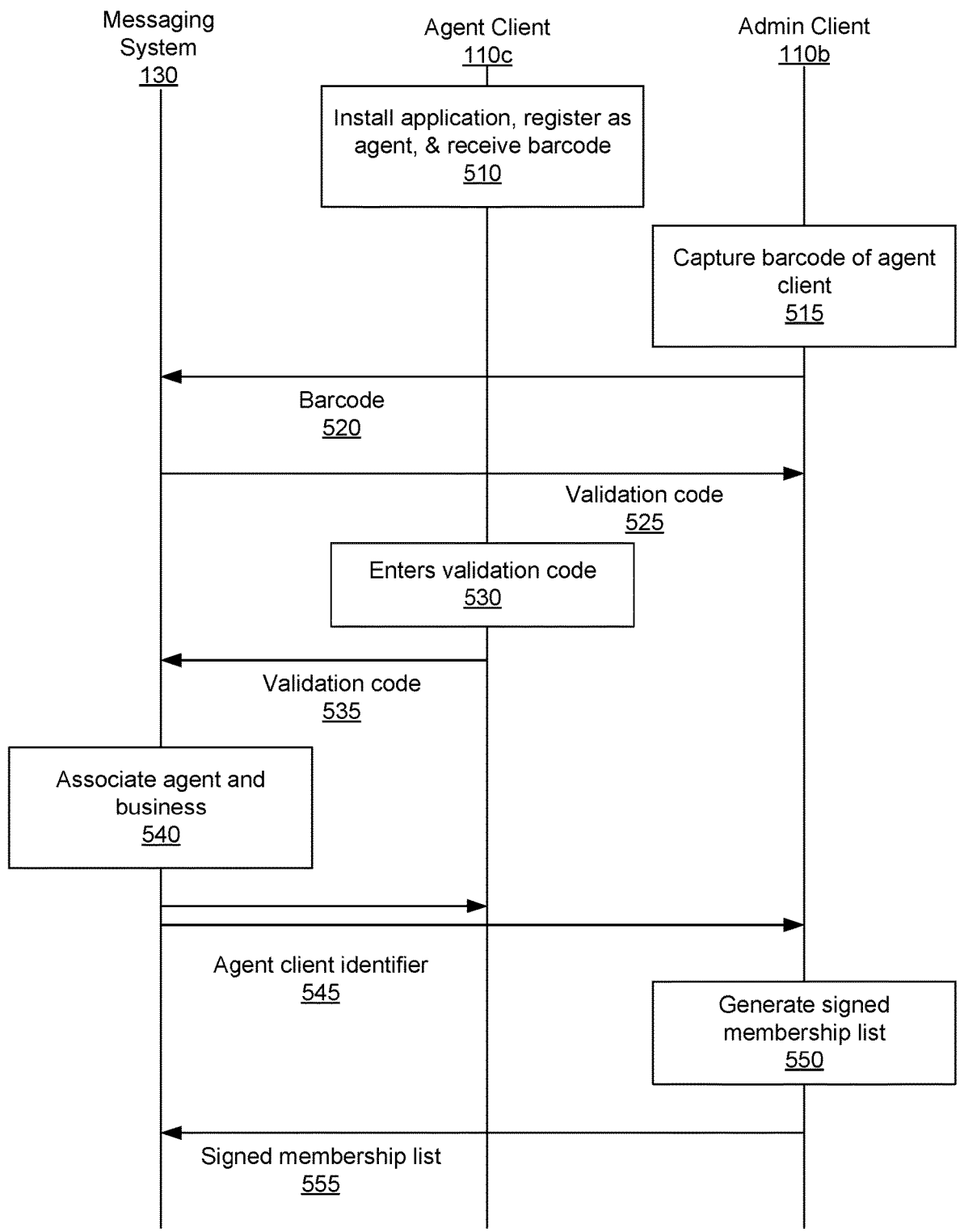
FIG. 5 is a flow diagram illustrating an example of interactions among the entities of FIG. 1 to register an agent with a business according to one embodiment.

FIG. 5 is a flow diagram illustrating an example of interactions among the entities of FIG. 1 to register an agent with a business according to one embodiment. The top of FIG. 5 illustrates the messaging system 130, an agent client 110*c,* and an admin client 110*b*. An associated vertical line descends from each entity and represents the forward flow of time. Boxes on the vertical lines represent actions performed by the associated entity. Horizontal lines represent interactions between the entities associated with the vertical lines at which the horizontal lines terminate. The actions and interactions illustrated in FIG. 5 represent one embodiment. Other embodiments can have different actions and/or interactions, and the actions and/or interactions may occur in different orders. Additionally, in other embodiments, some actions may be performed in different entities, and the interactions may involve other entities.

The example of FIG. 5 begins with the user of the agent client 110*c* installing 510 the messaging application 112*c* on the agent client. The user sends 510 registration information to the messaging system 130 and receives a unique registration identifier in response. The messaging application 112*c* shows a barcode generated using the unique registration identifier on a display of the agent client 110*c*. The administrator of the business uses the admin client 110*b* to capture 515 an image of the displayed barcode. The admin client 110*b* sends 520 a description of the barcode to the messaging system 130.

The messaging system 130 validates the barcode and sends 525 a validation code to the admin client 110*b*. The admin client 110*b* displays the validation code, and the user of the agent client 110*c* enters 530 the validation code into the agent client. The agent client 110*c* sends 535 the validation code back to the messaging system 130. The messaging system 130 associates 540 the agent client 110*c* with the business and generates an agent client identifier for that agent client. The messaging system 130 provides the agent client identifier to the agent client 110*c* and the admin client 110*b*. The admin client 110*b* generates 550 a membership list including the agent client identifier, digitally signs the membership list, and provides 555 the signed membership list to the messaging system 130.

Figure 6:
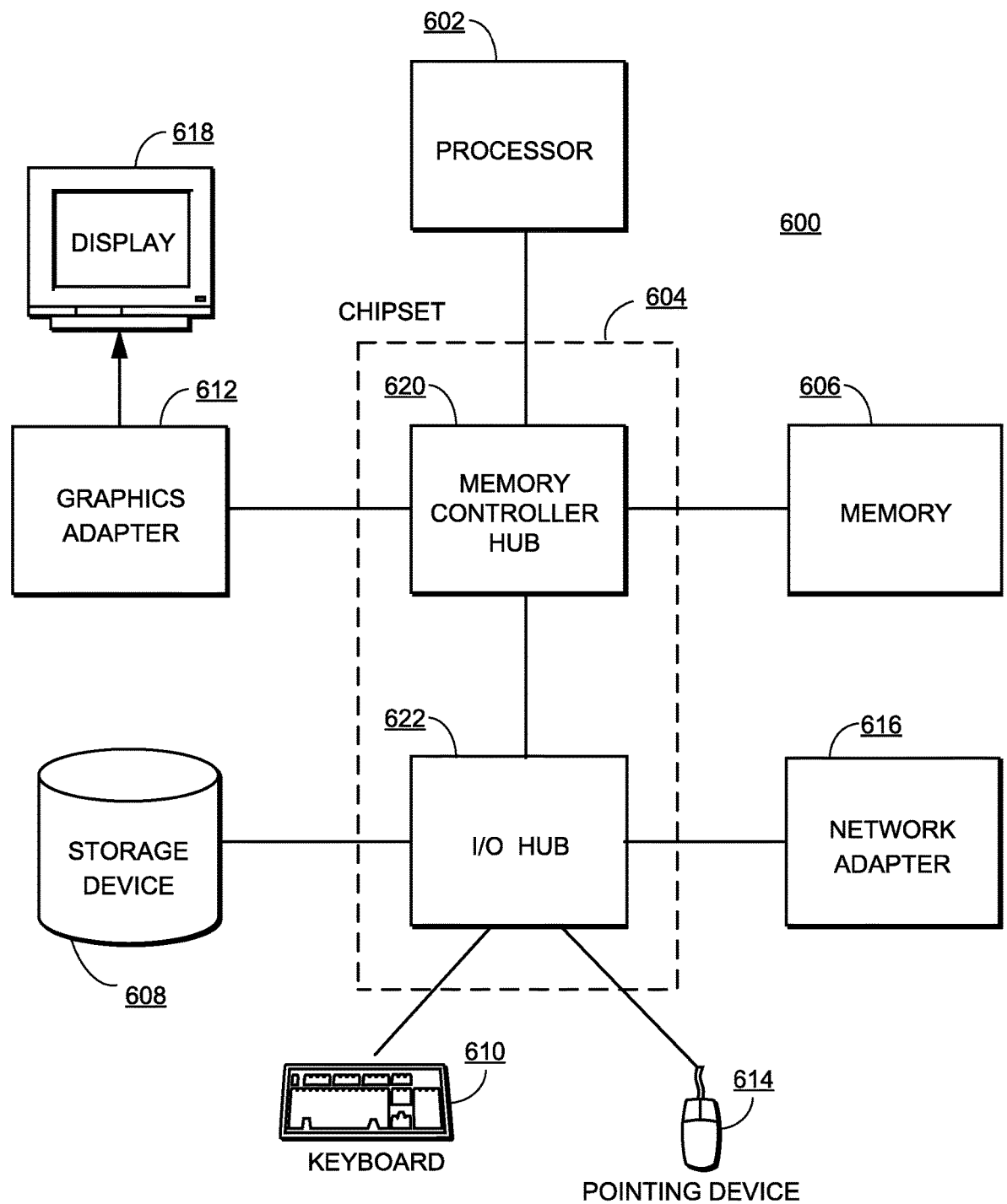
FIG. 6 is a high-level block diagram illustrating physical components of a computer used as part or all of one or more of the entities described herein in one embodiment.

FIG. 6 is a high-level block diagram illustrating physical components of a computer 600 used as part or all of one or more of the entities described herein in one embodiment. For example, instances of the illustrated computer 600 may be used as the messaging system 130, and/or a client 110. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising: receiving, at a messaging system, a digitally-signed membership list identifying a set of agent clients registered as agents of an entity that uses the messaging system, the digitally-signed membership list received from an administrator of the entity and digitally-signed by the administrator of the entity; receiving an encrypted message directed to the entity from a customer client at the messaging system; creating a customer group for the customer client, the customer group including an identifier of the customer client and the set of agent clients identified by the digitally-signed membership list; providing the digitally-signed membership list included in the customer group to the customer client, wherein the customer client is adapted to validate the digitally-signed membership list using the digital signature and, responsive to successful validation of the digitally signed membership list, use the identifiers of the agent clients in the set to send security information to the agent clients in the set; and distributing, by the messaging system, the encrypted message to other members of the customer group, wherein the agent clients of the set of agent clients are identified by the digitally-signed membership list are adapted to decrypt the encrypted message using the security information received from the customer client.

2. The method of claim 1, further comprising: receiving a plurality of encrypted messages directed to the entity from a plurality of customer clients; creating a respective customer group for each of the plurality of customer clients, each respective customer group including an identifier of a respective customer client and identifiers of the agent clients in the set; and providing the identifiers of the agent clients in the respective customer groups to the respective customer clients.

3. The method of claim 1, further comprising: receiving a second encrypted message directed to the customer client, the second encrypted message received from an agent client in the set of agent clients; and distributing the second encrypted message to members of the customer group including the customer client and to agent clients in the set of agent clients other than the agent client from which the second encrypted message was received.

4. The method of claim 3, wherein the customer client is adapted to receive the second encrypted message, decrypt the second encrypted message using security information received by the customer client from the agent client to produce a decrypted message, and display the decrypted message on the customer client as being from the entity for which the agent client is registered.

5. The method of claim 1, further comprising: determining an identifier of an admin client associated with the administrator of the entity; receiving from an agent client a validation code validating the agent client as an agent of the entity; creating an agent identifier for the agent client, the agent identifier derived from the identifier of the admin client; and providing the agent identifier to the admin client, wherein the agent identifier is included in the digitally-signed membership list received from the administrator of the entity.

6. The method of claim 5, further comprising: receiving a description of a barcode displayed by an agent client, the description received from the admin client; providing a validation code to the admin client responsive to receipt of the description of the barcode; and validating the agent client as an agent of the entity responsive to receipt of the validation code from the agent client; wherein the agent identifier is created responsive to validating the agent client.

7. A system comprising: a computer processor for executing computer program instructions; and a non-transitory computer-readable medium storing computer program instructions executable by the processor to perform operations comprising: receiving, at a messaging system, a digitally-signed membership list identifying a set of agent clients registered as agents of an entity that uses the messaging system, the digitally-signed membership list received from an administrator of the entity and digitally signed by the administrator of the entity; receiving an encrypted message directed to the entity from a customer client at the messaging system; creating a customer group for the customer client, the customer group including an identifier of the customer client and the set of agent clients identified by the digitally-signed membership list; providing the digitally-signed membership list included in the customer group to the customer client, wherein the customer client is adapted to validate the digitally-signed membership list using the digital signature and, responsive to successful validation of the digitally signed membership list, use the identifiers of the agent clients in the set to send security information to the agent clients in the set; and distributing, by the messaging system, the encrypted message to other members of the customer group, wherein the agent clients of the set of agent clients are identified by the digitally-signed membership list are adapted to decrypt the encrypted message using the security information received from the customer client.

8. The system of claim 7, the operations further comprising: receiving a plurality of encrypted messages directed to the entity from a plurality of customer clients; creating a respective customer group for each of the plurality of customer clients, each respective customer group including an identifier of a respective customer client and identifiers of the agent clients in the set; and providing the identifiers of the agent clients in the respective customer groups to the respective customer clients.

9. The system of claim 7, the operations further comprising: receiving a second encrypted message directed to the customer client, the second encrypted message received from an agent client in the set of agent clients; and distributing the second encrypted message to members of the customer group including the customer client and to agent clients in the set of agent clients other than the agent client from which the second encrypted message was received.

10. The system of claim 9, wherein the customer client is adapted to receive the second encrypted message, decrypt the second encrypted message using security information received by the customer client from the agent client to produce a decrypted message, and display the decrypted message on the customer client as being from the entity for which the agent client is registered.

11. The system of claim 7, the operations further comprising: determining an identifier of an admin client associated with the administrator of the entity; receiving from an agent client a validation code validating the agent client as an agent of the entity; creating an agent identifier for the agent client, the agent identifier derived from the identifier of the admin client; and providing the agent identifier to the admin client, wherein the agent identifier is included in the digitally-signed membership list received from the administrator of the entity.

12. The system of claim 11, the operations further comprising: receiving a description of a barcode displayed by an agent client, the description received from the admin client; providing a validation code to the admin client responsive to receipt of the description of the barcode; and validating the agent client as an agent of the entity responsive to receipt of the validation code from the agent client; wherein the agent identifier is created responsive to validating the agent client.

13. A non-transitory computer-readable storage medium storing computer program instructions executable by a processor to perform operations comprising: receiving, at a messaging system, a digitally-signed membership list identifying a set of agent clients registered as agents of an entity that uses the messaging system, the digitally-signed membership list received from an administrator of the entity and digitally signed by the administrator of the entity; receiving an encrypted message directed to the entity from a customer client at the messaging system; creating a customer group for the customer client, the customer group including an identifier of the customer client and the set of agent clients identified by the digitally-signed membership list; providing the digitally-signed membership list included in the customer group to the customer client, wherein the customer client is adapted to validate the digitally-signed membership list using the digital signature and, responsive to successful validation of the digitally signed membership list, use the identifiers of the agent clients in the set to send security information to the agent clients in the set; and distributing, by the messaging system, the encrypted message to other members of the customer group, wherein the agent clients of the set of agent clients are identified by the digitally-signed membership list are adapted to decrypt the encrypted message using the security information received from the customer client.

14. The non-transitory computer-readable storage medium of claim 13, the operations further comprising: receiving a plurality of encrypted messages directed to the entity from a plurality of customer clients; creating a respective customer group for each of the plurality of customer clients, each respective customer group including an identifier of a respective customer client and identifiers of the agent clients in the set; and providing the identifiers of the agent clients in the respective customer groups to the respective customer clients.

15. The non-transitory computer-readable storage medium of claim 13, the operations further comprising: receiving a second encrypted message directed to the customer client, the second encrypted message received from an agent client in the set of agent clients; and distributing the second encrypted message to members of the customer group including the customer client and to agent clients in the set of agent clients other than the agent client from which the second encrypted message was received.

16. The non-transitory computer-readable storage medium of claim 13, the operations further comprising: determining an identifier of an admin client associated with the administrator of the entity; receiving from an agent client a validation code validating the agent client as an agent of the entity; creating an agent identifier for the agent client, the agent identifier derived from the identifier of the admin client; and providing the agent identifier to the admin client, wherein the agent identifier is included in the digitally-signed membership list received from the administrator of the entity.

17. The non-transitory computer-readable storage medium of claim 16, the operations further comprising: receiving a description of a barcode displayed by an agent client, the description received from the admin client; providing a validation code to the admin client responsive to receipt of the description of the barcode; and validating the agent client as an agent of the entity responsive to receipt of the validation code from the agent client; wherein the agent identifier is created responsive to validating the agent client.

\* \* \* \* \*